US006953305B2

(12) United States Patent
John et al.

(10) Patent No.: US 6,953,305 B2
(45) Date of Patent: Oct. 11, 2005

(54) BUNDLE OF PIPES AND METHOD FOR PARALLEL ARRANGEMENT OF PIPES ACCORDING TO A BORE AND SWIVEL METHOD

(75) Inventors: Martin John, Schwerte (DE); Klaus Rous, Dortmund (DE)

(73) Assignee: Stadtwerke Schwerte GmbH, Schwerte (DE)

(*) Notice: Subject to any disclaimer, the term of this patent is extended or adjusted under 35 U.S.C. 154(b) by 0 days.

(21) Appl. No.: 10/470,496

(22) PCT Filed: Jan. 29, 2002

(86) PCT No.: PCT/EP02/00891

§ 371 (c)(1), (2), (4) Date: Jul. 29, 2003

(87) PCT Pub. No.: WO02/061319

PCT Pub. Date: Aug. 8, 2002

(65) Prior Publication Data

US 2004/0081516 A1 Apr. 29, 2004

(30) Foreign Application Priority Data

Jan. 30, 2001 (DE) ........................................ 101 03 859

(51) Int. Cl.[7] ............................ F16L 1/00; F16L 55/18

(52) U.S. Cl. .................... 405/184; 405/178; 405/184.3; 175/53

(58) Field of Search ................................ 405/174, 178, 405/184, 184.1, 184.3, 184.4; 138/97–99, 114–117; 254/29 R; 175/19, 53, 106; 285/123.1, 123.5, 124.1

(56) References Cited

U.S. PATENT DOCUMENTS

| | | | | | |
|---|---|---|---|---|---|
| 3,822,903 | A | * | 7/1974 | McNeely et al. | 285/124.2 |
| 3,977,703 | A | * | 8/1976 | Curtis | 285/150.1 |
| 4,384,624 | A | * | 5/1983 | Duke et al. | 175/19 |
| 5,127,481 | A | * | 7/1992 | Hesse | 405/156 |
| RE34,978 | E | | 6/1995 | Adams et al. | |
| 5,505,558 | A | | 4/1996 | Brown | |
| 5,816,345 | A | * | 10/1998 | Keller | 175/53 |
| 6,524,031 | B2 | * | 2/2003 | Carter et al. | 405/184.3 |
| 6,565,285 | B1 | * | 5/2003 | Landrichter | 405/155 |
| 6,702,520 | B2 | * | 3/2004 | Paletta | 405/184.3 |

FOREIGN PATENT DOCUMENTS

| | | |
|---|---|---|
| DE | 3544258 | 6/1986 |
| DE | 19901536 | 7/2000 |
| GB | 22465331 | 1/1992 |

* cited by examiner

*Primary Examiner*—Jong-Suk (James) Lee
(74) *Attorney, Agent, or Firm*—Collard & Roe, P.C.

(57) ABSTRACT

A bundle of tubes or pipes is arranged without trenches according to a fluid-assisted drilling method. A bore channel is made in a first boring step and the bore channel is widened when the bore/flushing head is removed therefrom, the bundle of tubes being drawn into the bore channel. The bundle is composed of individual tubes and flanges arranged lengthwise at a distance from and used as spacers for the tubes. A method is also described, wherein a rotational decoupling device prevents the rotational movement of the bore/flushing head produced during the removal process from being transmitted to the bundle of tubes. The bundle of tubes are supported by stabilizing devices inside the bore channel in the same spatial position as that of the tubes in relation to each other and the surrounding environment and are drawn through the bore channel.

27 Claims, 2 Drawing Sheets

BUNDLE OF PIPES AND METHOD FOR PARALLEL ARRANGEMENT OF PIPES ACCORDING TO A BORE AND SWIVEL METHOD

CROSS REFERENCE TO RELATED APPLICATIONS

Applicants claim priority under 35 U.S.C. §119 of GERMAN Application No. 101 03 859.3 filed on Jan. 30, 2001. Applicants also claim priority under 35 U.S.C. §365 of PCT/EP02/00891 filed on Jan. 29, 2002. The international application under PCT article 21(2) was not published in English.

BACKGROUND OF THE INVENTION

1. Field of the Invention

The invention concerns a bundle of tubes for the laying of tubes by means of a trenchless laying according to the fluid-assisted drilling method in which in a first drilling process a drilling channel is generated and during the retracting movement of the boring-flushing head this drilling channel is expanded and in this process the bundle of tubes is retracted into the drilling channel, and a procedure for the parallel laying of tubes by means of a trenchless laying according to the fluid-assisted drilling method in which in a first drilling process one drilling channel is generated and during the retracting movement of the boring-flushing head this drilling channel is expanded and in this process a bundle of tubes is retracted into the drilling channel.

2. The Prior Art

The laying of tubes according to the so-called horizontally fluid-assisted drilling method is used increasingly to be able to lay tubes or also wires with building measures as few as possible at the surface also in the inside urban area retentively built-up, for example. Particularly by the use of so-called controlled drilling proceedings the fluid-assisted drilling method offers an economic and fast alternative for the conventional laying of tubes and wires in the open trench. The application spectrum extends on many tube building measures in the context of the gas, long-distance energy supply and drinking water supply as well as the laying of sewage pressure tubes as well as cable protection tubes for TV or telecommunications, traffic conducting systems, emergency telephones or for low-, medium-, high-voltage cables and light wave conductors. Underrunning fluxes, channels, motorways, track ways or the like approximately without impediment of the operation is also possible.

At the fluid-assisted drilling method in a first pass with a boring-flushing head a small drilling channel in respect of the crosscut is bored which, controlled by probes, shows if possible the desired course below a surface. If the first drilling channel is finished then this drilling channel is enlarged to the needed crosscut dimensions in one or several passes by the use of respective expanding heads, normally this expansion is carried out during the pulling back of the boring-flushing head after the first pass. For this the original boring-flushing head is replaced by an expanding head which is milling at its periphery and expanding the drilling channel by milling in retreat direction. Therefore water is injected at high pressure into the boring zone, whereby also supplements of so-called Bentonit contribute to an improvement in the drilling behaviour and a hardening of the drilling channel. This process of the crosscut enlargement is carried out repeatedly if necessary. At the last process of this kind the tube or like to be pulled in is attached to the expanding head so that after the complete running through of the now extended drilling channel the needed arrangement of the drilling channel with the tube is readily carried out.

For the further rationalization it is increasingly tried out, to lay not only one pipe in one pass but just more tubes in the same pass if possible. This is particularly useful if different tubes shall be laid newly simultaneously with different functions in the context of rehabilitation measures, for example, furthermore it is made approximately better use of the needed building space within for example a street as if in several single drilling events the individual tubes must be laid separately with greater distances to each other respectively. It is problematically in this way of combined laying of several tubes inside such a drilling channel created by means of the fluid-assisted drilling method that the tubes are charged on torsion along the laying length because of the rotary movement of the boring-flushing head and the expanding head and therefore twist themselves to each other. On the one hand, this leads to a strong load of the material of the tubes, through what either the tubes can break or are no longer passable through by buckling, on the other hand, the location of the tubes is completely uncertain to each other or to the surface at the mounting place. This is particularly problematic by the fact that the connection of consumers gets approximately problematic in the case of combined drawing-in gas tubes, water tubes and vacant tubes for telecommunications and the like if due to the twisting the for example gas tubes and water tubes in the departure place just lie below the vacant tubes for the telecommunications. By this e.g. the attaching of T-pieces or junctions gets problematic, through what additional building measures become necessary in the respective departure places which considerably make more expensive the complete proceedings. It also can happen that the tubes don't keep a provided distance to each other so that there isn't a corresponding mounting space sufficiently for fittings etc.

SUMMARY OF THE INVENTION

It is therefore an object of the invention on hand to develop further a bundle of tubes or a procedure for the parallel laying of tubes according to a fluid-assisted drilling method so that a laying also of several tubes can be carried out without twisting of the bundle of tubes or change of the distances between the tubes so that the retracted bundle of tubes is always laid in defined spatial position relative to each other and to the surroundings.

The solution of the object according to the invention results by providing a bundle of tubes for the laying of tubes by means of a trenchless laying according to the fluid-assisted drilling method in which in a first drilling process a drilling channel is generated and during the retracting movement of the boring-flushing head this drilling channel is expanded and in this Process the bundle of tubes is retracted into the drilling channel, wherein the bundle of tubes is formed by a number of single tubes which are ordered in distance to each other by means of flanges distantly arranged at the tubes in lengthwise direction of the tubes. With regard to the Procedure, the invention provides a method for the parallel laying of tubes by means of a trenchless laying according to the fluid-assisted drilling method in which in a first drilling process one drilling channel is generated and during the retracting movement of the boring-flushing head this drilling channel is expanded and in this process a bundle of tubes is retracted into the drilling channel wherein during the retraction of the rotating boring-flushing head and expanding of the drilling channel the rotary movement of the boring-blushing head is not transmitted to the bundle of tubes by means of a device for rotary decoupling and the bundle of tubes is pulled through the drilling channel supported in constant spatial Position of the tubes to each other and to the surroundings by means of stabilizing devices inside the drilling channel. Further advantageous developments of the invention are discussed below.

The solution according to the invention in one aspect starts out from a bundle of tubes for the laying of tubes by means of a trenchless laying according to the fluid-assisted drilling method, in which in a first drilling process a drilling channel is generated and during the retracting movement of the boring-flushing head this drilling channel is expanded and in this process the bundle of tubes is retracted into the drilling channel. Such a bundle of tubes is developed further in a way according to the invention in such a manner, that the bundle of tubes is formed by a number of single tubes which are ordered in distance to each other by means of flanges distantly arranged at the tubes in lengthwise direction of the tubes. By this the tubes are fixed to each other according to the distances of the flanges to each other and therefore can move no longer or no longer inadmissibly themselves relatively to each other. By this furthermore a considerably stiffer connection of the individual tubes is formed, which is much more resistant against twisting and torsions than the individual tubes not fixed to each other in case of conventional pulling-in of several tubes simultaneously. By this the bundle of tubes twists itself not so much in case of conventional pulling-in into a drilling channel according to the fluid-assisted drilling method, as this happens during laying of single tubes not fixed to each other. This further development of the invention is of course also analogously transferable to the pulling-in of only one tube if for example torsion loads would lead to inadmissible or not desirable material loads.

A further improvement at laying of bundles of tubes is obtainable by the way, that at the rotating boring-flushing head a non co-rotating expanding cone is arranged in such a manner, that the expanding cone expands during the pulling back the drilling channel generated by the boring-flushing head to the needed crosscut dimensions for the laying of the bundle of tubes. The non co-rotating expanding cone causes therefore an exact generation of the drilling channel suitable for the pulling-in of the bundle of tubes provided with the flanges, whereby it is a special advantage, that in a further development the expanding cone presses flat against the walls of the drilling channel covered with mud and generated by the boring-flushing head and is supported by these walls and the spatial position of the expanding cone relative to the surroundings is stabilized. By this it is ensured for certain, that the bundle of tubes fixed to the expanding cone does not underlie the rotary movement generated by the boring-flushing head and is stressed not or only very little on torsion. The support of the expanding cone at the walls of the drilling channel as well as an appropriate device for the decoupling of the rotary movement of the boring-flushing head from the expanding cone capture the rotary movement of the boring-flushing head largely. At the same time the expanding cone calibrates the drilling channel so that the flanges are well drawn through the drilling channel and can support themselves at the same time to the walls of the drilling channel.

A further improvement of the stabilisation of the expanding cone in the drilling channel can be obtained thereby, that the expanding cone shows a number of, preferably symmetric, essentially axial recesses, distributed at the periphery, which stabilizes the spatial position of the expanding cone relative to the surroundings by means of the drilling mud, which penetrates here in lengthwise direction of the drilling channel. The drilling mud is compressed because of the pressure ratio between the boring-flushing head and the expanding cone and causes additionally to the surface pressure at the cone surfaces an almost form-fit support of the expanding cone.

There is a further advantage, if there is arranged at least one device for rotary decoupling between the boring-flushing head and the expanding cone, which decouples the rotary movement of the boring-flushing head from the bundle of tubes connected to the expanding cone. Such devices can for example consist of pivot bearings or the same, which are well known in the field of slings for load suspension devices and therefore shall not be described here furthermore.

A further development provides, that the flanges show dimensions, which are smaller or correspond at least in sections essentially to the cross-section of the largest diameter of the expanding cone. By this the already mentioned supporting effect also of the flanges can be obtained at the inside of the drilling channel since then the expanding cone preforms the drilling channel accordingly.

The development of the flanges provides, that the flanges are formed essentially plate-shaped and are secured to the tubes perpendicular to the lengthwise direction of the tubes. This basic construction of the flanges approximately reminding of clamps for hose pipes or the like offers a high strength for the fixation of the flanges at the tubes at simultaneously low weight of the flanges and thus only insignificant rise of the weight of the bundle of tubes in relation to the weight of the individual tubes.

A preferred embodiment provides, that the flanges show essentially at least two plate-shaped component parts, in which in the respective component parts supplementary, essentially semicircular openings are provided, in which the tubes can be inserted and which are closable by the respectively accompanying other component part sticking the tubes. By this it can be obtained, that a simple assembly of the tubes with the flanges can be carried out and the assembly is also simultaneously possible along the bundle of tubes in arbitrary places shortly before the pulling-in of the bundle of tubes into the drilling channel. So a central middle section of the flange can be inserted between the tubes forming the bundle of tubes and then the respective further component parts can be put on to the tubes and the central middle section of the flange and for example screwed together or stucked together or glued together or fixed together in an other known manner.

An embodiment provides, that the flanges are arranged in essentially regular distances at the tubes on behalf of forming the bundle of tubes. By this essentially even conditions can be achieved by the flanges with regard to the stabilization of the bundle of tubes along the complete length of the bundle of tubes.

Also it can be thought, that the flanges near to the expanding cone are arranged in a smaller distance to each other, here preferably essentially between 0.5–2 meters, as in the pull-in direction further behind the expanding cone, here preferably essentially between 3–6 meters. Particularly at the beginning of the bundle of tubes near at the boring-flushing head with his rotary movement it can be important, to provide additionally stabilization for the bundle of tubes and provide additional support areas for the flanges at the inner walls of the drilling channel.

An embodiment provides, that the flanges stay fixed to the bundle of tubes after pulling-in into the drilling channel. By the usage of so-called lost flanges it is obsolete to carry out additional building measures for the recovering of the flanges.

Also it can be thought, that the flanges can be fixed to the bundle of tubes in such a manner, that after pulling-in them into the drilling channel the flanges come to lie in stress-relieving pits driven down from the surface and can be accessibly dismantled from the bundle of tubes again.

As in the fluid-assisted drilling method often so-called unstressing pits are provided in certain distances at which the arising drilling mud is siphoned, at the same time also for example in the area of the house connection technique anyway at places apart from each other branches for the supply conducts of the houses or the like are needed, the position of the flanges at the bundle of tubes can be exactly so carried out, that the flanges come to lie approximately in these unstressing pits when the bundle of tubes is as agreed pulled-in. By this the flanges can be dismantled and reused again after pulling-in by what the costs for the production of the flanges can be apportioned on appropriately many usages.

Further stabilization of the bundle of tubes within the drilling channel can be achieved by that in the flanges openings in the region of the flanges surrounded by the tubes are provided in such a manner, that mud generated by the boring-flushing head can enter the space between two adjacent flanges and essentially body it out. Especially if to the drilling mud, as usual in the fluid-assisted drilling method, so-called Bentonit is added, then the bundle of tubes is additionally supported by means of the drilling mud entered between the two adjacent flanges against torsional strain which possibly can be guided across the expansion cone. This is caused in an advantageous way by the pressurization of the drilling mud essentially in this space which stabilizes the bundle of tubes on behalf of its spatial position to the surroundings.

Furthermore is to start out from that the outer edges of the flanges are supported by the walls of the drilling channel formed by the expanding cone in such a manner, that the flanges and the hereto fixed tubes during the pulling-in of the bundle of tubes are guided during gliding by the inner wall of the drilling channel, in which also the mud operates as antiseize agent during the movement of the flanges on the walls of the drilling channel. Easily pulling-in of the bundle of tubes is supported in addition through this and, simultaneously, further the torsion strain of the bundle of tubes is reduced due to the good support to the walls of the drilling channel.

Another improvement in the supporting effect can be achieved, if the outer profile of the flanges is formed irregular. To this contributes that the irregular profile of the flanges causes a solidification of the drilling mud adjacently to these irregular forms, by which the flanges slide along the inner wall of the drilling channel guided by the hardened drilling mud against torsion. Similar already like the arrangement of corresponding recesses at the expansion cone the drilling mud hardens also in these irregularly formed areas of the flanges and causes an additional form-fit support of the bundle of tubes in the area of the flanges.

The invention concerns furthermore a procedure for the parallel laying of tubes by means of a trenchless laying according to the fluid-assisted drilling method, in which in a first drilling process one drilling channel is generated and during the retracting movement of the boring-flushing head this drilling channel is expanded and in this process a bundle of tubes is retracted into the drilling channel. This can of course be especially a procedure for the laying of a bundle of tubes wherein the bundle of tubes is formed by a number of single tubes which are ordered in distance to each other by means of flanges distantly arranged at the tubes in lengthwise direction of the tubes. Such a generic procedure is developed further in that during the retraction of the rotating boring-flushing head and expanding of the drilling channel the rotary movement of the boring-flushing head is not transmitted to the bundle of tubes by means of a device for rotary decoupling and the bundle of tubes is pulled through the drilling channel supported in constant spatial position of the tubes to each other and to the surroundings by means of stabilizing devices inside the drilling channel. In this way in further development stabilizing devices in form of an expanding cone, especially an expanding cone wherein at the rotating head a non co-rotating expanding cone is arranged in such a manner, that the expanding cone expands during the pulling back the drilling channel generated by the boring-flushing head to the needed crosscut dimensions for the laying of the bundle of tubes, and flanges for the connection of the tubes to a bundle of tubes, especially flanges can be used that are distantly arranged at the tubes in lengthwise direction of the tubes and the bundle of tubes is pulled into the drilling channel in such a spatial position relative to the surroundings, which corresponds to the spatial position of the bundle of tubes in the pulled-in state.

There is an advantage, if tubes consisting of materials capable of bearing tensile forces are pulled in, preferably tubes made of metallic materials and/or tubes made of synthetic materials like PEHD or PEX. Such materials are usual in building pipework.

Of course it can be thought, that in a further development tubes with different diameters and/or different usage are pulled in in one common pass. So tubes can be pulled-in at the same time in a bundle of tubes for the gas supply, the electricity supply, the water supply and also the telecommunications as well as universally usable vacant tubes, for example.

Furthermore it can be thought, that the bundle of tubes is pulled off a feed roll and the flanges are pre-assembled before the pulling in.

It is also conceivable particularly at plastic tubes which can be rolled up without problems with corresponding rolling radii that the flanges are already pre-assembled on the roll and therefore only still few or no more preparations for the bundle of tubes must be made at the building site.

Another embodiment provides, that the tubes of the bundle of tubes as for example at metallic tubes are manufactured of single bar-shaped tube sections and than together with the fixing of the bar-shaped tube sections the flanges are pre-assembled before the pulling in.

BRIEF DESCRIPTION OF THE DRAWINGS

A particularly preferential embodiment of the bundle of tubes according to the invention as well as the procedure according to the invention are shown in the drawings.

It is shown in.

Figure 1:
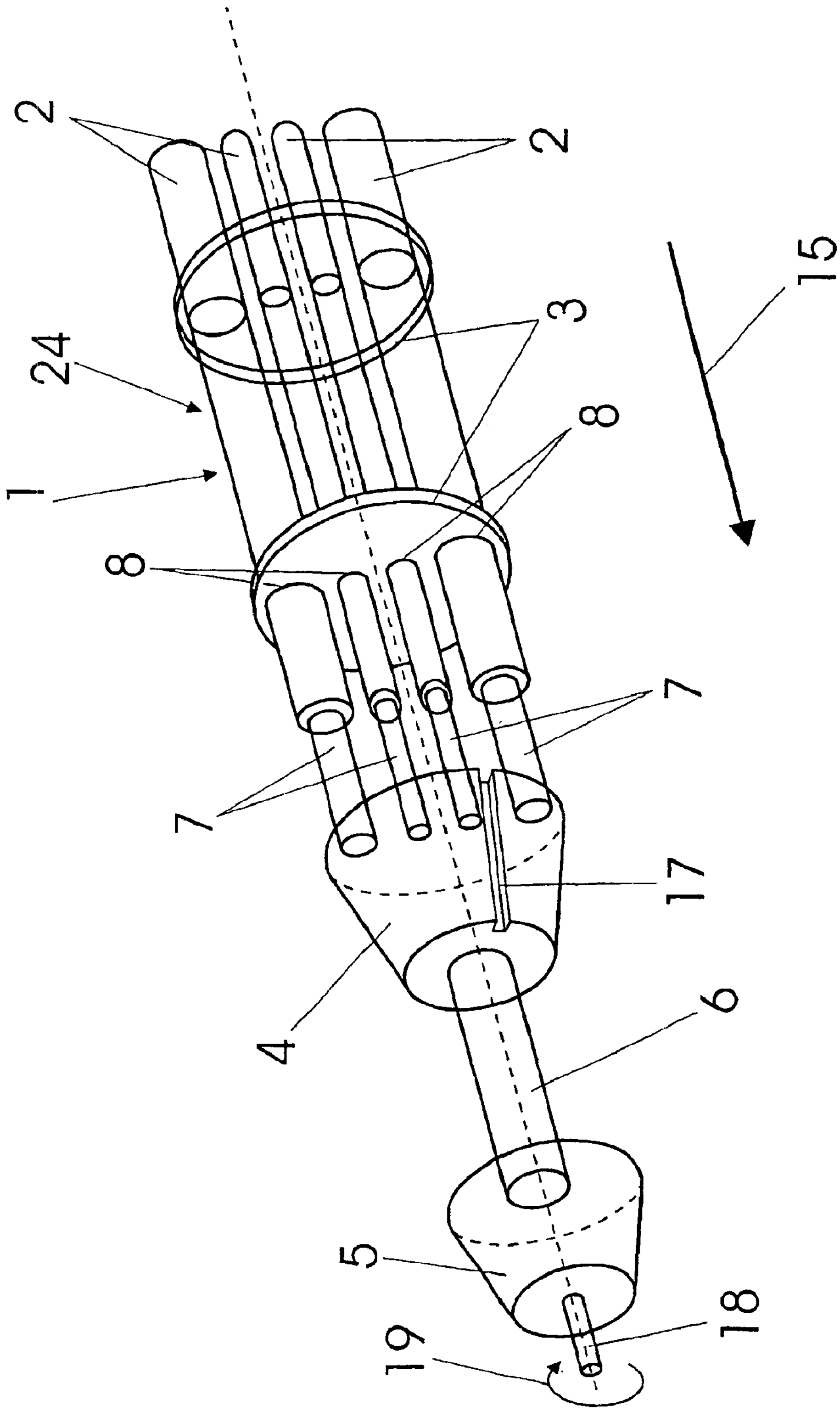
FIG. 1—an arrangement of a bundle of tubes according to the invention with additional devices arranged to this, FIG. 2—a crosscut through a drilling channel generated by a fluid-assisted drilling method with a bundle of tubes and a flange shown in a crosscut.

In the FIG. 1 the fundamental construction of a bundle of tubes arranged according to the invention is shown in a very schematic representation, in which only the front section of the bundle 1 of tubes formed by the tubes 2 is represented with two flanges 3 ordered to this. The bundle 1 of tubes can extend in the direction contrary to the pull-in direction 15 in usual length for fluid-assisted drilling technique.

DETAILED DESCRIPTION OF PREFERRED EMBODIMENTS

At the left end of the bundle 1 of tubes also only schematically indicated shown is a boring-flushing head 5 in form of an expansion head, which is connected to an respective, also only partly represented drive unit by means of boring rods 18 also only represented in sections. The boring-flushing head 5 turns along the direction of rotation 19 and mills larger in an expansion proceeding a drilling channel 9 produced in a first pass. Such expansion heads 5 are in principle known and therefore shall not be further described here.

Contrary to the pull-in direction 15 of the bundle 1 of tubes into the not precisely shown drilling channel 9 behind the expansion head 5 a device 6 for the rotary decoupling is schematically shown, which for example can consist of one or a number of turning knuckled joints, by which it is guaranteed, that the rotary movement of the expansion head 5 in the turning direction 19 is transferred not or nor as much to the expanding cone 4 placed behind the device 6. Such devices 6 for the rotary decoupling are for example variously known from the area of sling means or also the general mechanical engineering and therefore shall not here be further explained either.

Behind the device 6 for the rotary decoupling there is shown an expanding cone 4, which here owns a similar taper angel as the boring-flushing head 5, but simultaneously is formed with his largest diameter a little larger than the boring-flushing head 5. The expanding cone 4 has multiple functions during the pulling-in of the bundle 1 of tubes, which will be further explained below. In the expanding cone 4 there are arranged recesses 17, regularly distributed at the periphery of the cone area, which can for example be arranged in the form of grooves. These grooves extend essentially about the whole length of the cone area and serve for support of the expanding cone 4 at the walls 16 of the drilling channel 9 when pulling-in the bundle 1 of tubes in a manner also explained still later.

A number of tubes 2, here of four tubes 2, is ordered behind the expanding cone 4 at the back of the expanding cone 4 by means of coupling devices 7 also only indicated schematically. The coupling devices 7 can show for example hooked elements, this one intrude on corresponding counter-hooks or devices according to snap rings or like that. Contrary to the pull-in direction 15 one fixation each is provided at the end of the coupling devices 7 on the side of the tube at the individual tubes 2, the coupling devices 7 is for example welded on at the tubes 2 or connected with these in another in principle known way. The forces which are transferred by the boring rods 18 to the bundle 1 of tubes when pulling-in the bundle 1 of tubes in the direction of the pulling-in direction 15 can therefore be taken by each of the tubes 2. It has to be said that the arrangement of the tubes 2 as well as its number in the FIG. 1 of course is chosen completely arbitrarily so that the invention can refer to many different arrangements and amounts of tubes 2 with regard to the arrangement of the bundle 1 of tubes. It is also conceivable that a transfer of the invention for pulling-in only one tube 2 may be obvious, if for example this tube 2 is appropriately sensitive or other boundary conditions shall make a torsion of the tube 2 impossible.

Figure 2:
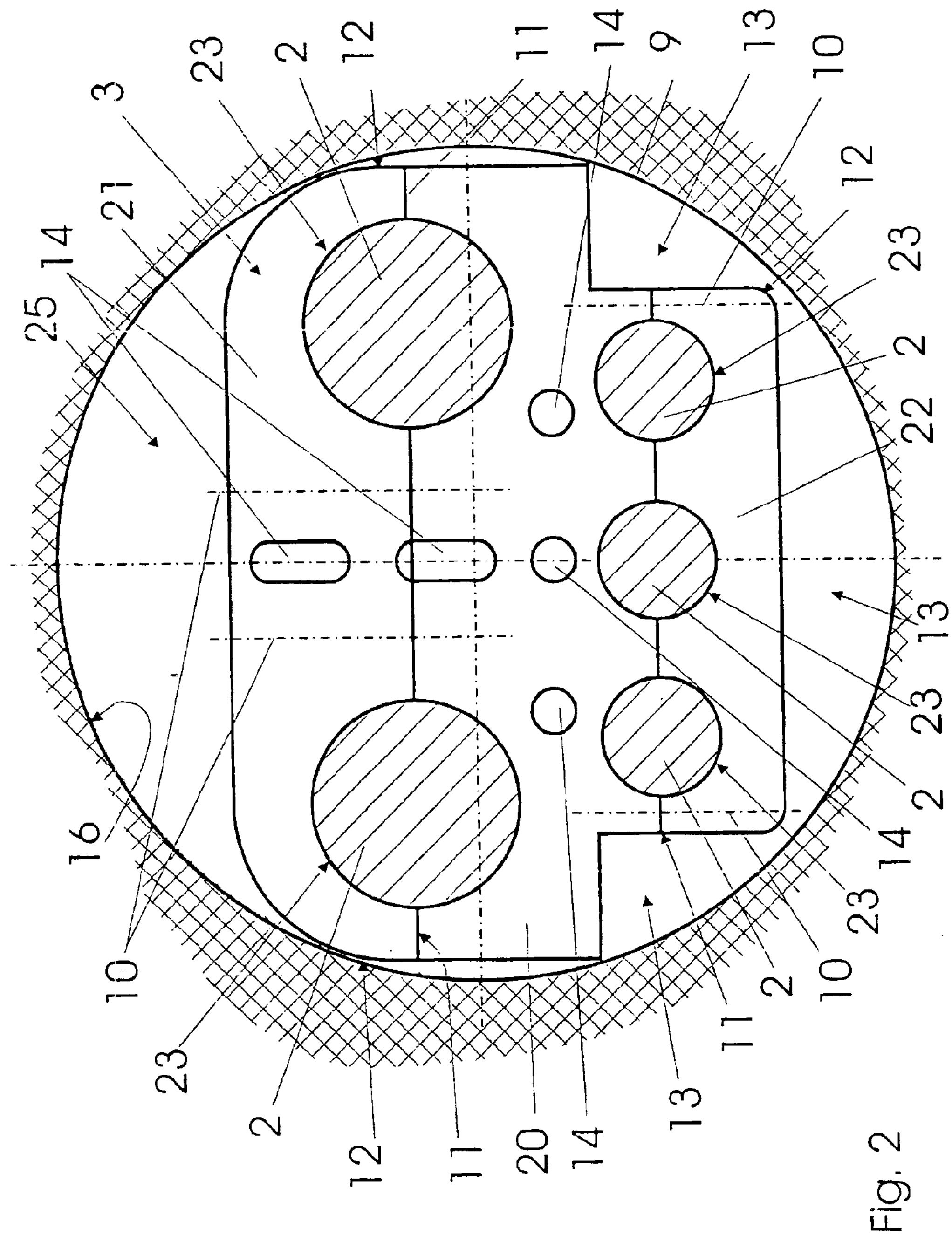

The tubes 2 of the bundle 1 of tubes are connected to each other with two shown flanges 3, the construction of these is indicate only roughly schematically and which are explained in an advantageous arrangement in the FIG. 2 still more precisely. The flanges 3 show corresponding openings 8 for the insertion of the tubes 2 so that the flanges 3 hold the tubes 2 of the bundle 1 of tubes. The flanges 3 are built up at least bipartitely so that at least two parts of the flanges 3 can be separated from each other for assembling at the bundle 1 of tubes or for inserting the tubes 2 into the openings 8.

First of all it has to be mentioned between the adjacent arranged flanges 3, that while pulling-in of the bundle 1 of tubes drilling mud which is formed at the boring-flushing head 5 presses contrary to the pulling-in direction 15 into the drilling channel 9 and is on the one hand compressed into the recesses 17 in the expansion cone 4, while simultaneously flows through openings 14 represented still more precisely in the FIG. 2 which are provided in the flanges 3. By this a mud storage capacity 24 is each formed between the two adjacent flanges 3 and of course in the flanges 3 arranged behind this contrary to the pulling-in direction 15, which fundamentally contributes to the stabilization of the spatial position of the bundle 1 of tubes in still more precisely described form.

In the FIG. 2 is now once again to recognize more exactly in a cut top view the construction of a flange 3. The flange 3 is here arranged in a drilling channel 9 which has resulted of the expansion by the expanding head 5 and pulling-in through the expansion cone 4. The largest dimensions of every flange 3 are essentially identical with the dimensions of the walls 16 of the drilling channel 9 so that every flange 3 at least in sections fits closely to the walls 16 of the drilling channel 9.

The flange 3 is built up essentially three-partly in which a central middle part 20 is plugged in between the great upper and the smaller below arranged tubes 2. In the middle part 20 respectively semicircular openings 23 are provided in which the tubes 2 can be inserted. Respectively on the upper side of the upper tubes 2 and sub-sided of the lower tubes 2 further parts of the flange 3 formed like clamps are to be seen, namely a upper part 21 und a lower part 22. In this upper part 21 und the lower part 22 corresponding also semicircular openings 23 are let in which corresponds with the semicircular openings 23 of the middle part 20 and complete these to a full circle. The diameters of these openings 23 correspond essentially to the diameter of the respective tube 2 in which the dimensions are chosen so that the tubes 2 are friction-lockedly held by means of attachment screws 10 in the now completed flange 3 after mounting of upper part 21 und lower part 22 onto the middle part 20. It has to be taken care that the tubes 2 are not stuck too strongly to cause no damages to the tubes 2. With this multisectional construction of the flange 3 it is possible to arrange and to fasten certainly the flange 3 in any arbitrary place of the bundle 1 of tubes also shortly before pulling-in into the drilling channel 9. A dismantling is also relatively simply possible in ditches, for example, since the attachment screws 10 are accessible relatively well and the flange 3 therefore can easily be removed from the tubes 2.

Also can be recognized in the FIG. 2 that the flange 3 only in sections fits closely to the walls 16 of the drilling channel 9 in which below the upper tubes 2 recesses of the outer profile of the flange 3 can be recognized which fill themselves with compressed drilling mud 13 in a manner still described and stabilizes the position of the flange 3 and with that the bundle 1 of tubes within the drilling channel 9. A largely free crosscut 25 above the flange 3 can be recognized which serves for the removal of the superfluous drilling mud 13. Since the bundle 1 of tubes shows of course a corresponding deadweight, the flange 3 will support himself in the area essentially sub-sided of the edges marked by the subject numbers 12 and the lateral areas next to the large tubes 2 at the inner wall 16 of the drilling channel 9. Already alone by this a corresponding stabilization of the bundle 1 of tubes can be achieved since by means of friction between the outer profile of the flange 3 and the walls 16 a respective support on behalf of torsion loads is possible, which can be transferred to the flanges 3 or the bundle 1 of tubes as residuals of the rotary movement of the boring-flushing head along the direction 19 of rotation.

Also can be recognized in the FIG. 2 that in the flanges 3 there are provided openings 14 for penetrating drilling mud 13 from the area in pulling-in direction 15 in front of the flange 3 to the area in pulling-in direction 15 behind the flange 3. These openings 14 which can of course be arranged differently lead to that the drilling mud 13, which is generated under a high pressure in the area of the boring-flushing head 5 can essentially fill out the mud storage capacity 24 between adjacently arranged flanges 3 and in addition stabilizes the bundle 1 of tubes in this mud storage capacity 24 of his spatial position. One can imagine this drilling mud as a kind of stopper, which consists of the drilling mud which is quite thick and simultaneously still compressed and counteracts toughly a twist of the bundle 1 of tubes on behalf of a torsion load transferred from the boring-flushing head 5. This drilling mud can of course leave again in the further course of the drilling process contrary to the pulling-in direction 15 by the openings 14 provided by the next flange 3 or by the free crosscut 15 and be promoted to behind.

The drilling mud which is generated in the area of the boring-flushing head 5, will also accumulate in the area of the projections of the profile of the flange 3 below the large tubes 2 and harden in this area, by which an additional support effect is also performed on the flange 3 and with that on the bundle 1 of tubes.

Another support effect arises in that the expanding cone 4 also fits closely at the walls 16 of the drilling channel 9 at least with the area of the largest diameter, which is as a rule a little greater than the diameter of the boring-flushing head 5, during pulling-in of the bundle 1 of tubes in pulling-in direction 15 and supports itself because of the drawing movement against these walls 16. Because of the surface pressure arising between the walls 16 of the drilling channel 9 and the expansion cone 4 also a support of torsional moments is ensured, the drilling channel 9 is calibrated in his dimensions simultaneously and by this the passage of the flanges 3 through the drilling channel 9 is improved.

The special construction of the bundle 1 of tubes or also the sequence of operations of the proceedings according to the invention can generally be described so that by the prominently described measures for the stabilization of the bundle 1 of tubes in the drilling channel 9 it is provided that independent of the turning movement of the boring-flushing head 5 the bundle 1 of tubes keeps strictly its spatial position in between the drilling channel 9, namely keeps that spatial position, in which the bundle 1 of tubes was fed into the drilling channel 9 initially. This has the great advantage that the spatial position of the bundle 1 of tubes along the drilling channel 9 always remains identical and by means of the effect of the flanges 3 the distance of the tubes 2 to each other remains always the same, too. On the one hand, an inadmissible load of the tubes 2 due to torsion is prevented for certain through this, on the other hand, the connection conditions are for example always the same for attaching junctions at the tubes 2 along the drilling channel 9.

Therefore for example it cannot happen, that e.g. the large tubes 2 come to lie below the small tubes 2 by a distortion, so that a connection of a consumer or the like is not possible or only very much effort.

List of Subject Numbers

| | |
|---|---|
| 1 | bundle of tubes |
| 2 | tubes |
| 3 | flange |
| 4 | expansion cone |
| 5 | boring-flushing head |
| 6 | rotary decoupling |
| 7 | coupling device |
| 8 | clamp lug |
| 9 | drilling channel |
| 10 | attachment screw |
| 11 | commissure |
| 12 | support |
| 13 | hardened drilling mud |
| 14 | passing through openings for drilling mud |
| 15 | pulling-in direction |
| 16 | walls drilling channel |
| 17 | recesses |
| 18 | boring rods |
| 19 | rotary movement boring-flushing head |
| 20 | middle part of flange |
| 21 | upperpart of flange |
| 22 | lower part of flange |
| 23 | openings for tubes |
| 24 | mud storage capacity |
| 25 | free crosscut |

What is claimed is:

1. A combination comprising:

(a) a bundle of tubes adapted to be laid without trenches in a drilling channel according to a fluid assisted drilling process, said bundle comprising a plurality of individual tubes and a plurality of flanges arranged along the tubes and separating the tubes from each other by a distance, said flanges being secured to said bundle so that when the tubes are drawn into the drilling channel during the drilling process, said flanges stabilize said bundle against twisting within the drilling channel;

(b) an expanding cone receiving the bundle of tubes; and (c) a boring-flushing head rotationally decoupled with said expanding cone;

wherein the expanding cone expands the drilling channel generated by the boring-flushing head to the needed crosscut dimensions for the laying of the bundle of tubes.

2. The combination according to claim 1, wherein the expanding cone is adapted to press flat against mud-covered walls of the drilling channel generated by the boring-flushing head for stabilizing the spatial position of the expanding cone relative to the surroundings.

3. The combination according to claim 1, wherein the expanding cone comprises a number of generally axial peripheral recesses for stabilizing with drilling mud the spatial position of the expanding cone relative to the surroundings.

4. The combination according to claim 1, further comprising at least one device for rotary decoupling arranged between the boring-flushing head and the expanding cone, said at least one device decoupling rotary movement of the boring-flushing head from the bundle of tubes connected to the expanding cone.

5. The combination according to claim 1, wherein the flanges have dimensions, which are smaller or generally correspond at least in sections to the cross-section of the largest diameter of the expanding cone.

6. The combination according to claim 1, wherein the flanges near to the expanding cone are arranged at a smaller distance to each other as compared with the flanges further behind the expanding cone.

7. The combination according to claim 1, wherein the flanges stay fixed to the bundle of tubes after the bundle is drawn into the drilling channel.

8. A bundle of tubes adapted to be laid without trenches in a drilling channel according to a fluid-assisted drilling process, the bundle comprising:

(a) a plurality of individual tubes; and (b) a plurality of flanges arranged along the tubes and separating the tubes from each other by a distance;

wherein said flanges are secured to said bundle so that when the tubes are drawn into the drilling channel during the drilling process, said flanges stabilize said bundle against twisting within the drilling channel.

9. The bundle of tubes according to claim 8, wherein the flanges are formed generally plate-shaped and are secured to the tubes perpendicular to the length of the tubes.

10. The bundle of tubes according to claim 8, wherein the flanges comprise at least two plate-shaped component parts having respective generally semicircular openings for receiving the tubes, the openings being closable by the respective component part receiving the tubes.

11. The bundle of tubes according to claim 10, wherein the at least two plate-shaped component parts of the flanges can be secured together.

12. The bundle of tubes according to claim 8, wherein the flanges are arranged in generally regular distances along the tubes for forming the bundle of tubes.

13. The bundle of tubes according to claim 8, wherein said flanges are secured to said bundle so that when the tubes are drawn into the drilling channel during the drilling process, said flanges come to lie in stress-relieving pits for accessible dismantling of said flanges from said bundle.

14. The bundle of tubes according to claim 1, further comprising a plurality of openings provided in said flanges and surrounded by said tubes so that mud generated during the drilling process fills an area between two adjacent flanges.

15. The bundle of tubes according to claim 14, wherein the bundle is adapted to receive the mud between the two adjacent flanges so as to cause a pressure build-up in the area for stabilizing the bundle of tubes spatially relative to the surroundings.

16. The bundle of tubes according to claim 14, wherein the bundle is adapted to receive the mud between the two adjacent flanges so as to cause the mud to operate as an antiseize agent during the movement of the flanges along the drilling channel.

17. The bundle of tubes according to claim 1, wherein the flanges have irregularly formed outer profiles.

18. The bundle of tubes according to claim 17, wherein said irregularly formed outer profiles are adapted to cause hardening of adjacent mud during the drilling process so that the flanges slide along an inner wall of the drilling channel.

19. A combination comprising:

(a) a bundle of tubes comprising a plurality of individual tubes and a plurality of flanges arranged along the tubes and separating the tubes from each other by a distance;

(b) an expanding cone receiving the bundle of tubes; and (c) a boring-flushing head rotationally decoupled with said expanding cone;

wherein said expanding cone is adapted to form an expanded inner wall of a drilling channel generated by said boring-flushing head during retraction of said head from the channel; and wherein said flanges have outer edges adapted to be supported by said wall so as to guide said flanges and said tubes as the bundle of tubes is drawn into the channel.

20. A method of laying tubes without trenches according to a fluid-assisted drilling process comprising the steps of:

(a) forming a bundle of tubes comprising a plurality of individual tubes ordered in distance to each other by means of flanges arranged along the tubes and separating the tubes from each other by a distance, the flanges being secured to the bundle so that when the tubes are drawn into a drilling channel during the drilling process, the flanges stabilize said bundle against twisting within the drilling channel;

(b) generating a drilling channel in a first drilling process; and (c) retracting a boring-flushing head to cause expansion of the drilling channel and retraction of the bundle of tubes into the drilling channel.

21. The method according to claim 20, wherein during retraction of the boring-flushing head and expansion of the drilling channel rotary movement of the boring-flushing head is not transmitted to the bundle of tubes by means of a device for rotary decoupling and the bundle of tubes is pulled through the drilling channel supported in constant spatial position of the tubes to each other and to the surroundings by means of stabilizing devices inside the drilling channel.

22. The method according to claim 21, wherein as stabilizing devices are used an expanding cone, and the flanges.

23. The method according to claim 21, wherein the bundle of tubes is pulled into the drilling channel in such a spatial position relative to the surroundings, which corresponds to the spatial position of the bundle of tubes in the pulled-in state.

24. The method according to claim 21, wherein tubes comprising materials capable of bearing tensile forces are pulled in.

25. The method according to claim 21, wherein tubes with different diameters and/or different usage are pulled in in one common pass.

26. The method according to claim 21, wherein the bundle of tubes is pulled off a feed roll and the flanges are pre-assembled before the pulling in.

27. The method according to claim 21, wherein the bundle of tubes is manufactured of single bar-shaped tube sections and the flanges are pre-assembled before the pulling in.

* * * * *